United States Patent  (10) Patent No.: US 9,069,091 B2
Iranpour et al.  (45) Date of Patent: Jun. 30, 2015

(54) GENERATING SWEEP SEQUENCES (75) Inventors: Kambiz Iranpour, Oslo (NO); Staffan Eriksson, Göteborg (SE); Christer Hoerlin, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 407 days.

(21) Appl. No.: 12/174,406

(22) Filed: Jul. 16, 2008

(65) Prior Publication Data

US 2009/0052278 A1  Feb. 26, 2009

Related U.S. Application Data

(60) Provisional application No. 60/957,128, filed on Aug. 21, 2007.

(51) Int. Cl.
*G01V 1/00* (2006.01)

(52) U.S. Cl.
CPC ...................... *G01V 1/005* (2013.01)

(58) Field of Classification Search
CPC ............... G01V 1/005; G01V 1/145
USPC .......................... 367/37, 38, 41, 42
See application file for complete search history.

(56) References Cited

U.S. PATENT DOCUMENTS

| | | | | |
|---|---|---|---|---|
| 4,768,174 | A * | 8/1988 | Castle | 367/39 |
| 5,347,494 | A * | 9/1994 | Andersen | 367/42 |
| 6,891,776 | B2 * | 5/2005 | Moerig | 367/24 |
| 7,859,945 | B2 * | 12/2010 | Sallas et al. | 367/190 |

FOREIGN PATENT DOCUMENTS

| WO | 0165279 A1 | 9/2001 |
|---|---|---|
| WO | 2005019865 A2 | 3/2005 |

OTHER PUBLICATIONS

Xia et al. "Orthogonal vibroseis sweeps", GEophysical Prospecting, 2005, 53, 677-688.*
Xia et al., "Orthogonal vibroseis sweeps", Geophysical Prospecting, 2005, 53, 677-688.*
Kirkpatrick et al., "Optimization by Simulated Annealing", Science, May 1983, vol. 220, No. 4598.*
Kirkpatrick et al., "Optimization by Simulated Annealing". Science, May 1983, vol. 220, No. 4598.*
Karkkainen, Influence of Various PN Sequence Phase Optimization Criteria on the SNR Performance of an Asynchronous DS-CDMA System, Military Communications Conference, MILCOM 1995.
Dinan, et al., Spreading Codes for Direct Sequence CDMA and Wideband CDMA Cellular Networks, IEEE Communications Magazine, Sep. 1998, pp. 48-54.
Koza, Genetic Programming: A Paradigm for Genetically Breeding Populations of Computer Programs to Solve Problems, Computer Science Department, Stanford University, Jun. 1990.
Kirkpatrick, et al., Optimization by simulated annealing, Science, 1983, pp. 671-680, vol. 220.

(Continued)

*Primary Examiner* — Krystine Breier (57) ABSTRACT

A technique includes generating one or more sweep sequences for one or more seismic vibrators for a seismic survey and evaluating a cost for the sequence(s). The technique includes perturbing the sequence(s) and continuing the evaluation and perturbing until the cost is within a limit or a maximum number of perturbations is reached.

8 Claims, 7 Drawing Sheets

(56) References Cited

OTHER PUBLICATIONS

Poupaert, et al., Acceptance Driven Local Search and Evolutionary Algorithms, Proceedings of the Genetic and Evolutionary Computation Conference (GECCO-2001), Nov. 2001, pp. 1173-1180 citeseer.ist.psu.edu/561109.html.

International Search Report and Written Opinion issued in PCT/US2008/072792, on Feb. 24, 2010, 11 pages.
Hoover, et al., "Vibrator Signals", Proceedings of the IEEE, vol. 72, No. 10, (1984), pp. 1290-1306, XP002565646 pp. 1290-1296.

* cited by examiner

GENERATING SWEEP SEQUENCES

This application claims the benefit under 35 U.S.C. §119 (e) to U.S. Provisional Patent Application Ser. No. 60/957, 128, entitled, "EVOLUTIONARY SYSTEMS AND METHODS FOR PROCESSING SEISMIC DATA," which was filed on Aug. 21, 2007, and is hereby incorporated by reference in its entirety.

BACKGROUND

The invention generally relates to generating sweep sequences.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones). Industrial surveys may deploy only one type of sensors or both. In response to the detected seismic events, the sensors generate electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

Another type of seismic source is a seismic vibrator, which is used in connection with a "vibroseis" survey. For a seismic survey that is conducted on dry land, the seismic vibrator imparts a seismic source signal into the earth, which has a relatively lower energy level than the signal that is generated by an impulsive energy source. However, the energy that is produced by the seismic vibrator's signal lasts for a relatively longer period of time.

SUMMARY

In an embodiment of the invention, a technique includes generating a plurality of sweep sequences and evaluating a cost for the sequences. The technique includes perturbing the sequences and continuing the evaluation and perturbing until the cost is within a limit or a maximum number of perturbations is reached.

In an embodiment of the invention, a system includes a memory and a processor. The processor executes the program instructions to generate a plurality of sweep sequences for seismic vibrators for a seismic survey, evaluate a cost for the sequences and perturb the sequences. The processor executes the program instructions to continue the evaluation and perturbing of the sequences until the cost is within a limit or a maximum number of perturbations is reached In another embodiment of the invention, a system includes seismic vibrators. The seismic vibrators generate sweep sequences that are determined by generating a plurality of sweep sequences, evaluating a cost for the sequences, perturbing the sequences and continuing the evaluation and perturbing of the sequences until the cost is within a limit or a maximum number of perturbations is reached.

In another embodiment of the invention, a technique includes generating a sweep sequence for a seismic vibrator for a seismic survey. The technique includes evaluating a cost for the sequence and perturbing the sequence. The technique includes continuing the evaluation and perturbing until the cost is within a limit or a maximum number of perturbations is reached.

In yet another embodiment of the invention, a system includes a seismic vibrator. The seismic vibrator generate a sweep sequence that is determined by generating a sweep sequence, evaluating a cost for the sequence, perturbing the sequence and continuing the evaluation and perturbing of the sequence until the cost is within a limit or a maximum number of perturbations has been reached.

Advantages and other features of the invention will become apparent from the following drawing, description and claims.

DETAILED DESCRIPTION

Figure 1:
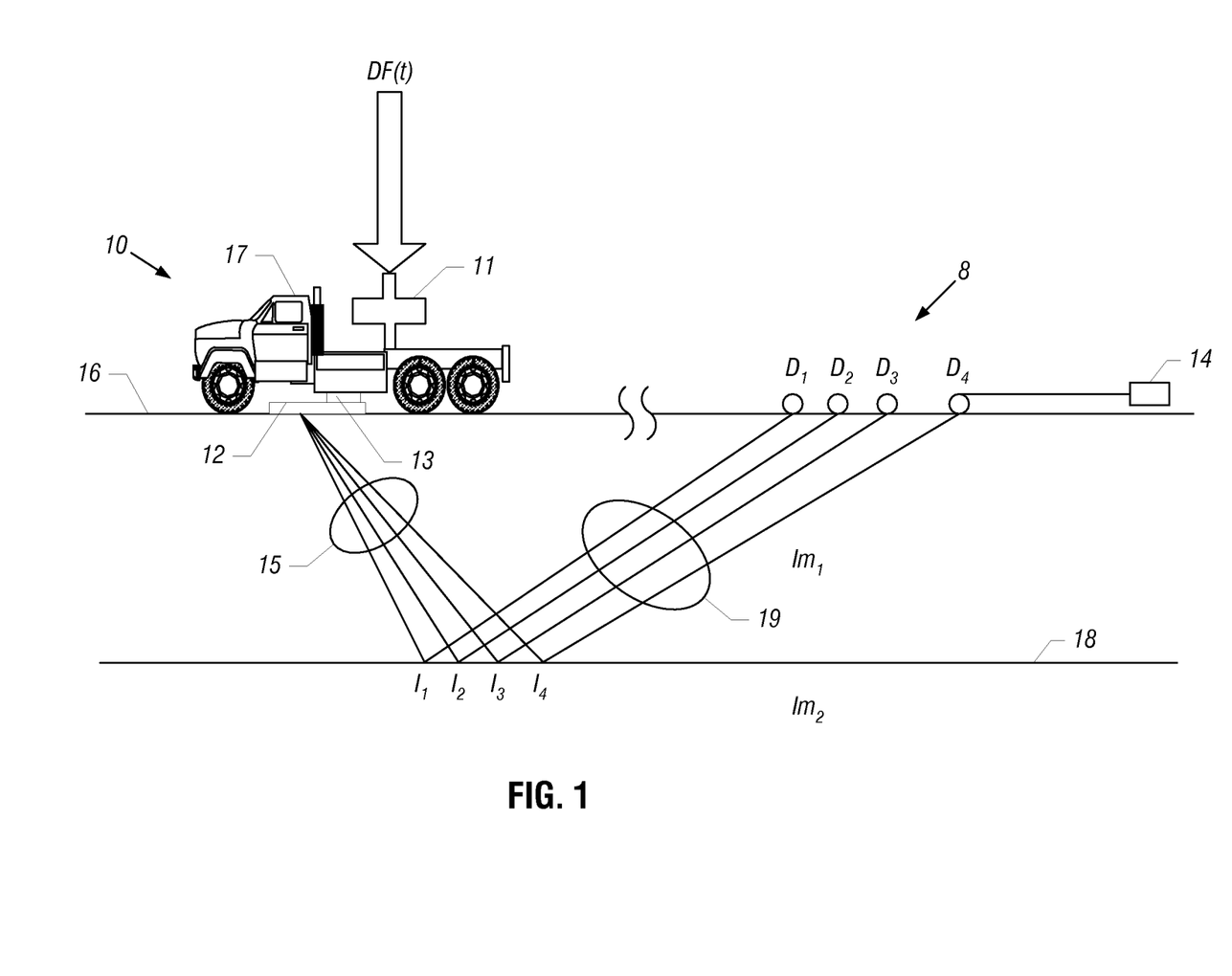
FIG. 1 is a schematic diagram of a vibroseis acquisition system according to an embodiment of the invention.

Referring to FIG. 1, an exemplary land-based vibroseis acquisition system 8 includes a surface-located seismic vibrator 10; surface-located geophones $D_1$, $D_2$, $D_3$ and $D_4$; and a data acquisition system 14. To perform a vibroseis survey, the seismic vibrator 10 generates a seismic source signal 15 for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by the geophones $D_1$, $D_2$, $D_3$ and $D_4$, respectively. The data acquisition system 14 gathers the raw seismic data acquired by the geophones $D_1$, $D_2$, $D_3$ and $D_4$, and the raw seismic data may be processed to yield information about subsurface reflectors and the physical properties of subsurface formations.

For purposes of generating the seismic source signal 15, the seismic vibrator 10 may contain an actuator (a hydraulic or electromagnetic actuator, as examples) that drives a vibrating element 11 in response to a driving signal (called "DF(t)"). More specifically, the driving signal DF(t) may be a sinusoid whose amplitude and frequency are changed during the sweep, as further discussed below. Because the vibrating element 11 is coupled to a base plate 12 that is in contact with the earth surface 16, the energy from the element 11 is coupled to the earth to produce the seismic source signal 15.

Among its other features, the seismic vibrator 10 may include a signal measuring apparatus 13, which includes sensors (accelerometers, for example) to measure the seismic source signal 15 (i.e., to measure the output force of the seismic vibrator 10). As depicted in FIG. 1, the seismic vibrator 10 may be mounted on a truck 17, an arrangement that enhances the vibrator's mobility.

The vibrating element 11 contains a reaction mass that oscillates at a frequency and amplitude that is controlled the driving signal DF(t): the frequency of the driving signal DF(t) sets the frequency of oscillation of the reaction mass; and the amplitude of the oscillation, in general, is controlled by a magnitude of the driving signal DF(t). During the sweep, the frequency of the driving signal DF(t) transitions (and thus, the oscillation frequency of the reaction mass transitions) over a range of frequencies, one frequency at time. The amplitude of the driving signal DF(t) is varied during the sweep pursuant to a designed amplitude-time envelope.

It is noted that unlike the seismic vibrator 10, a seismic vibrator may alternatively be constructed to be located in a borehole. Thus, seismic sensors, such as geophones, may alternatively be located in the borehole. Although specific examples of surface-located seismic vibrators and seismic sensors are set forth herein, it is understood that the seismic sensors, the seismic vibrator or both of these entities may be located downhole.

One way to increase the acquisition efficiency of the survey is to use multiple vibrators that generate separate sweep sequences. In this manner, one of the vibrators may operate its vibrating element to generate a particular sweep sequence, and during the time in which the vibrator is resetting its vibrating element, another vibrator may begin operating its vibrating sequence to generate another sweep sequence. The acquisition efficiency may be further improved by listening for one sweep sequence while another sweep sequence is being generated. However, the sweep sequences should not interfere with each other, which means the sweep sequences should be orthogonal. Ideally, orthogonal sweep sequences have a cross correlation that is zero.

Figure 2:
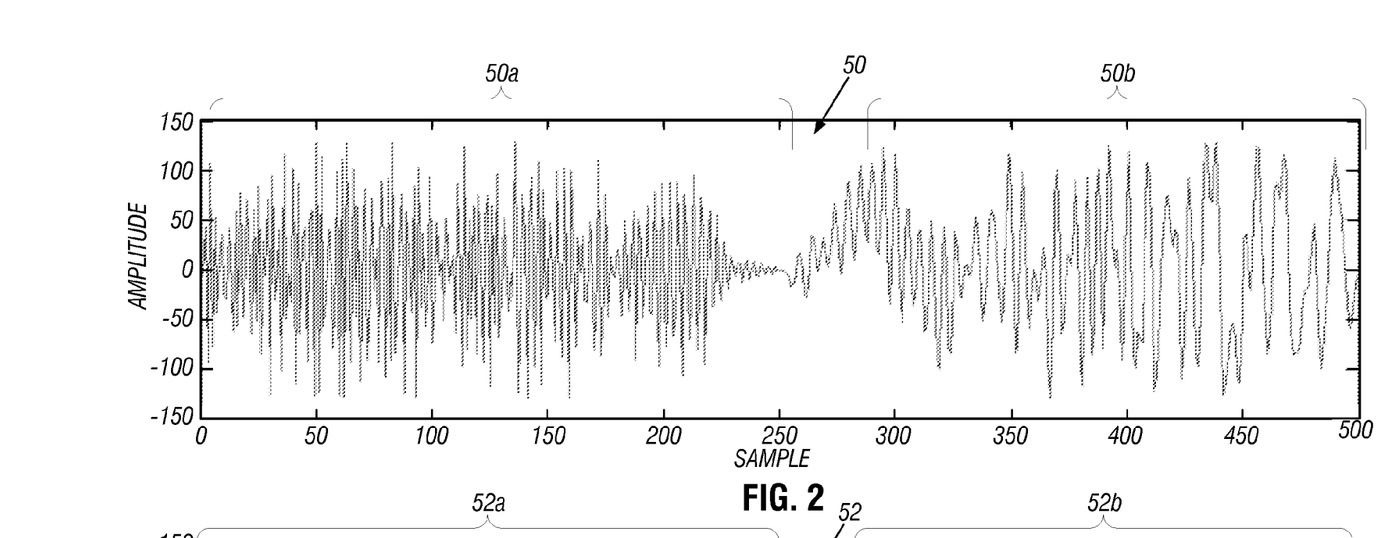
FIGS. 2 and 3 depict exemplary sweep sequences according to an embodiment of the invention.
Figure 3:
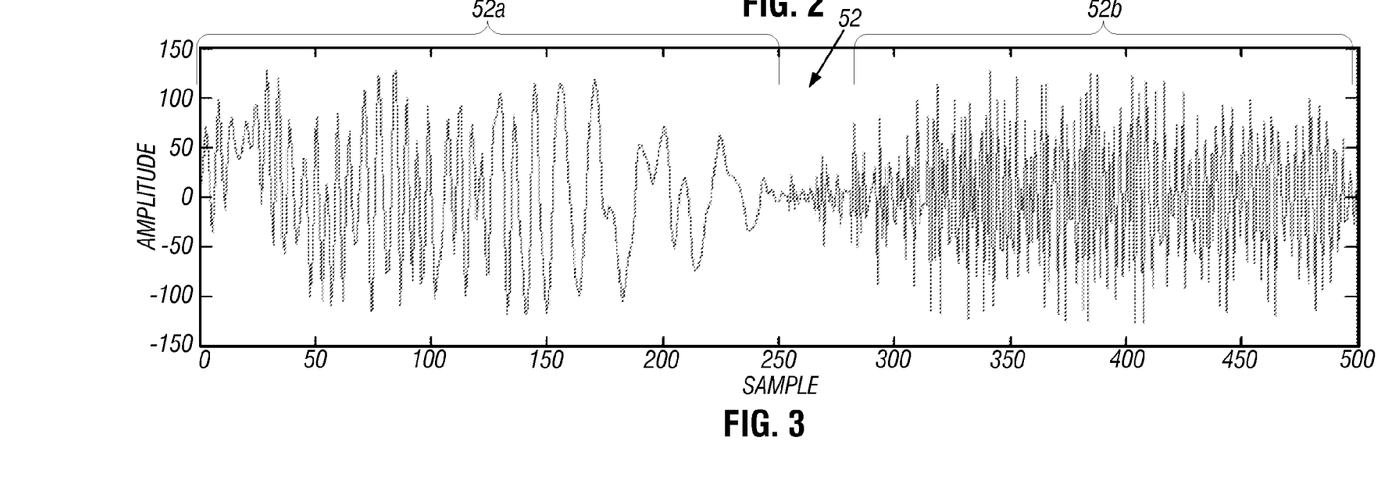
Figure 4:
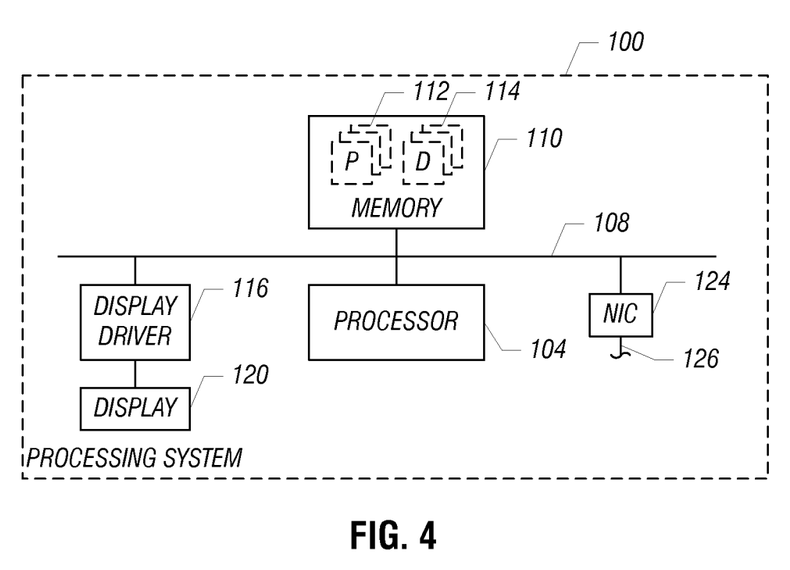
FIG. 4 is a schematic diagram of a processing system according to an embodiment of the invention.

Referring to FIGS. 2, 3 and 4 in accordance with embodiments of the invention described herein, a processing system 100 (see FIG. 4) is used to generate orthogonal sweep sequences, such as exemplary orthogonal sweep sequences 50 and 52 that are depicted in FIGS. 2 and 3, respectively. The sweep sequences 50 and 52 represent the seismic energy transmitted by the vibrating elements. It is noted that the associated driving signals may be identical to the depicted sweep sequences or may be pre-compensated to account for physical limitations and characteristics of the seismic vibrators, depending on the particular embodiment of the invention.

The sweep sequences 50 and 52 may be generated in the same exact time period or one sequence 50, 52 may lag behind the other sequence 50, 52, depending on the particular embodiment of the invention. As depicted in FIGS. 2 and 3, the sweep sequence 50 has an initial segment 50a that contains higher frequencies, as compared to an initial segment 52a of the sequence 52, which has lower frequencies. The latter portion 50b of the sweep sequence 50 has lower frequencies, as compared to the latter portion 52b of the sweep sequence 52, which has higher frequencies. It is noted that the sweep sequences 50 and 52 illustrate one out of many possible outcomes for a pair of orthogonal sweep sequences. For example, time reversing both sequences 50 and 52 results in a pair of orthogonal sweep sequences that have the same properties. Time reversing the sweep sequences 50 and 52 may be beneficial because the sequences become more like upsweeps rather than downsweeps.

As described herein, the processing system 100 uses an evolutionary technique, such as a simulated annealing or genetic algorithm (as non-limiting examples), to create pseudorandom sweep sequences for use in seismic vibrators. For purposes of generating the sweep sequences, constraints may be placed on the sequences, such as constraints on the frequency spectra; the amplitude spectra; the sidelobe levels at various lagtime windows and the mainlobe in the autocorrelation estimate; and the cross-correlation between the sweep sequences.

As a more specific example, in accordance with embodiments of the invention described herein, in the generation of the sweep sequences, a cost function is calculated and used as a decision making guide in determining whether to accept or reject changes in the sweep sequences. In general, the cost function may be characterized by a number of different factors, such as the autocorrelation of the generated sweeps, a cross-correlation and a total energy. It is noted that a standard deviation or any other measure of the sidelobe energy may be used in the optimization process.

Referring to FIG. 4, in general, the processing system 100 may include one or more processors 104, such as microcontrollers and/or microprocessors. In general, the processor 104 may be coupled through one or more buses 108 to a memory 110, which stores various programs 112 and datasets 114. In general, as described herein, the programs 112 may, when executed by the processor 104, cause the processor 104 to determine such results as autocorrelation estimates, cross-correlation estimates, cost functions, sweep sequence energy, probabilities of accepting worse solutions, etc. These parameters, in turn, may be stored as the datasets 114. Furthermore, the programs 112, when executed by the processor 104, may cause the processor 104 to perform the evolutionary methods that are described herein for purposes of generating the orthogonal sweep sequences.

It is noted that FIG. 4 depicts merely an example of one out of many possible architectures for the processing system 100. Thus, many variations are contemplated and are within the scope of the appended claims. For example, in accordance with other embodiments of the invention, the processing system 100 may be a distributed processing system and thus, may include processing subsystems that are connected together and may be located in different locations.

For the processing system 100 that is depicted in FIG. 4, the processing system 100 may also include a display driver 116 that drives a display 120 for purposes of displaying the results of the processing by the processor 104. As examples, the display 120 may display autocorrelation estimates, cross-correlation estimates, generated sweep sequences, etc. Additionally, as depicted in FIG. 4, the processing system 100 may include interfaces to communicate with other computer and/or processing systems, such as a network interface card (NIC) 124, which is connected to a network 126.

Figure 5:
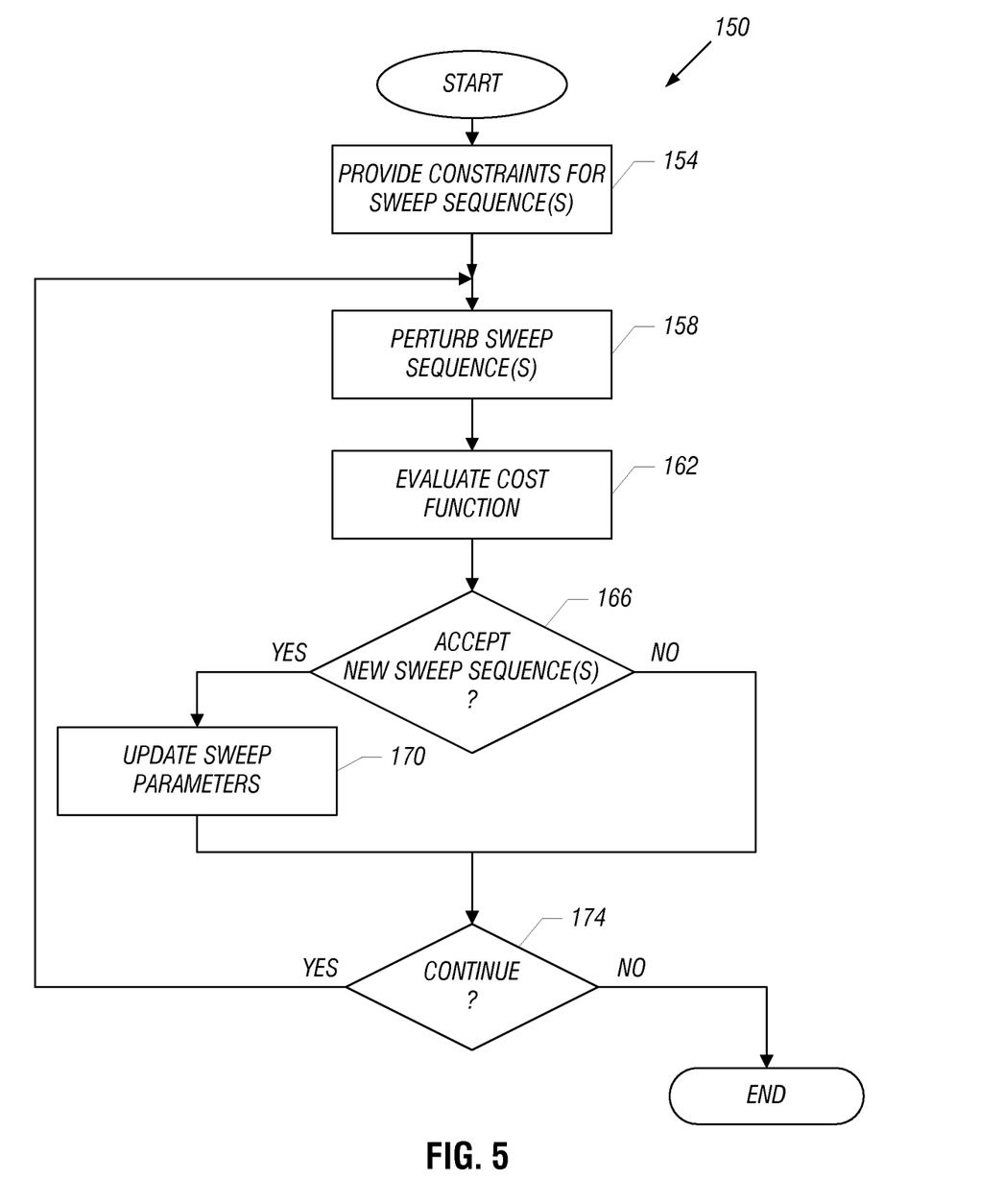
FIGS. 5 and 6 are flow diagrams depicting techniques to generate sweep sequences according to embodiments of the invention.

Referring to FIG. 5, regardless of the particular form of the processing system 100, the processing system 100 may execute instructions to perform a technique 150 for purposes of generating orthogonal sweep sequences or generating a single sweep sequence that has superior autocorrelation properties. Referring to FIG. 5, pursuant to the technique 150, the processing system 100 receives constraints (block 124) for the sweep sequence(s). As further described below, these constraints may be constraints on the frequency spectra, the amplitudes spectra, the lag windows between the sweep sequence(s), the phases of the sweep sequences, etc. Based on these constraints, an initial estimate the sweep sequence(s) is generated and then an iterative process begins to optimize the sweep sequence(s) within the constraints based on a calculated cost function.

More specifically, in accordance with some embodiments of the invention, the technique 150 includes perturbing (block 158) the sweep sequence(s), and for the perturbed sweep sequence(s), a cost function is determined, pursuant to block 162. The cost function may be a weighted combination of an autocorrelation estimate, a cross-correlation estimate (for multiple, orthogonal sweep sequences) and a total energy of the sweep sequence(s). Based at least in part on the calculated cost function, a determination is then made (diamond 166) whether to accept the new, perturbed sweep sequence(s). As further described below, this decision may be based at least in part on whether the cost is decreased or increased due to the perturbation as well as a probability that a better solution exists. Based on the decision in diamond 166, the sweep parameters may be updated, pursuant to block 170. A decision is then made, pursuant to diamond 174, whether the sweep sequence(s) should be further refined. It is noted that this decision may be based on, as further described herein, such factors as the maximum number of iterations and whether a predetermined cost has been achieved. If the generation continues, control returns to block 158.

In accordance with embodiments of the invention, a simulated annealing algorithm may be employed for purposes of generating the sweep sequence(s). Annealing is a technique for hardening metals, which involves heating up the metal to its melting point and then slowly cooling off the metal to allow the atoms of the metal to reach lower energy states. A simulated annealing algorithm involves exploring a solution space in a random or pseudo-random manner and evaluating a cost function for each evaluated solution.

Simulated annealing involves using a synthetic temperature (called "T" herein), which is initially large but decreases as the simulated annealing progresses. In general, many relatively bad solutions are accepted initially when the synthetic temperature T is large. As the synthetic temperature T decreases, fewer bad solutions are accepted as the algorithm settles on a minimum.

For each potential solution, a cost function is calculated and evaluated. If the proposed solution decreases the cost, then, in accordance with some embodiments of the invention, the solution is accepted and the sweep sequence(s) are updated accordingly. However, the simulated annealing algorithm does not necessarily reject solutions that increase the cost. Instead, a probability of accepting a worse solution is evaluated, and this probability is used for purposes of determining whether a solution that increases the cost will be accepted. The probability of accepting a worse solution decreases with the synthetic temperature T.

As a more specific example, the probability of accepting a worse solution involves evaluating the following expression:

$$P(\Delta E, T) = e^{\frac{\Delta E}{T}}, \qquad \text{Eq. 1}$$

where "$P(\Delta E,T)$" represents the probability of accepting a worse solution, "$\Delta E$" represents the difference in cost (between the current cost and the cost of the new solution) and "T" represents the synthetic temperature. In general, for a relatively large synthetic temperature T, more solutions are accepted, which are associated with increased costs. However, as the synthetic temperature T decreases, fewer solutions are accepted that increase the cost. By accepting higher cost alternatives during the initial phase of the simulated annealing algorithm, a larger solution space is evaluated and prevents the solution from prematurely settling in a local minimum. However, as the synthetic temperature T decreases to zero, the local minimum for the current solution is found.

The synthetic temperature T is decreased pursuant to a predetermined annealing schedule. In accordance with some embodiments of the invention, the annealing schedule may be described as follows:

$$T_n = \alpha^n T_0, \qquad \text{Eq. 2}$$

where "$T_n$" represents the synthetic temperature for the current iteration number (called "n"), "$\alpha$" represents a selected constant and "$T_0$" represents the initial value of the synthetic temperature (at iteration zero). Due to this relationship, the synthetic temperature $T_n$ has a positive initial value of $T_0$ and decreases to zero as the number of iterations increase.

Other probabilities may be evaluated and other annealing schedules may be used, in accordance with other embodiments of the invention.

Figure 6:
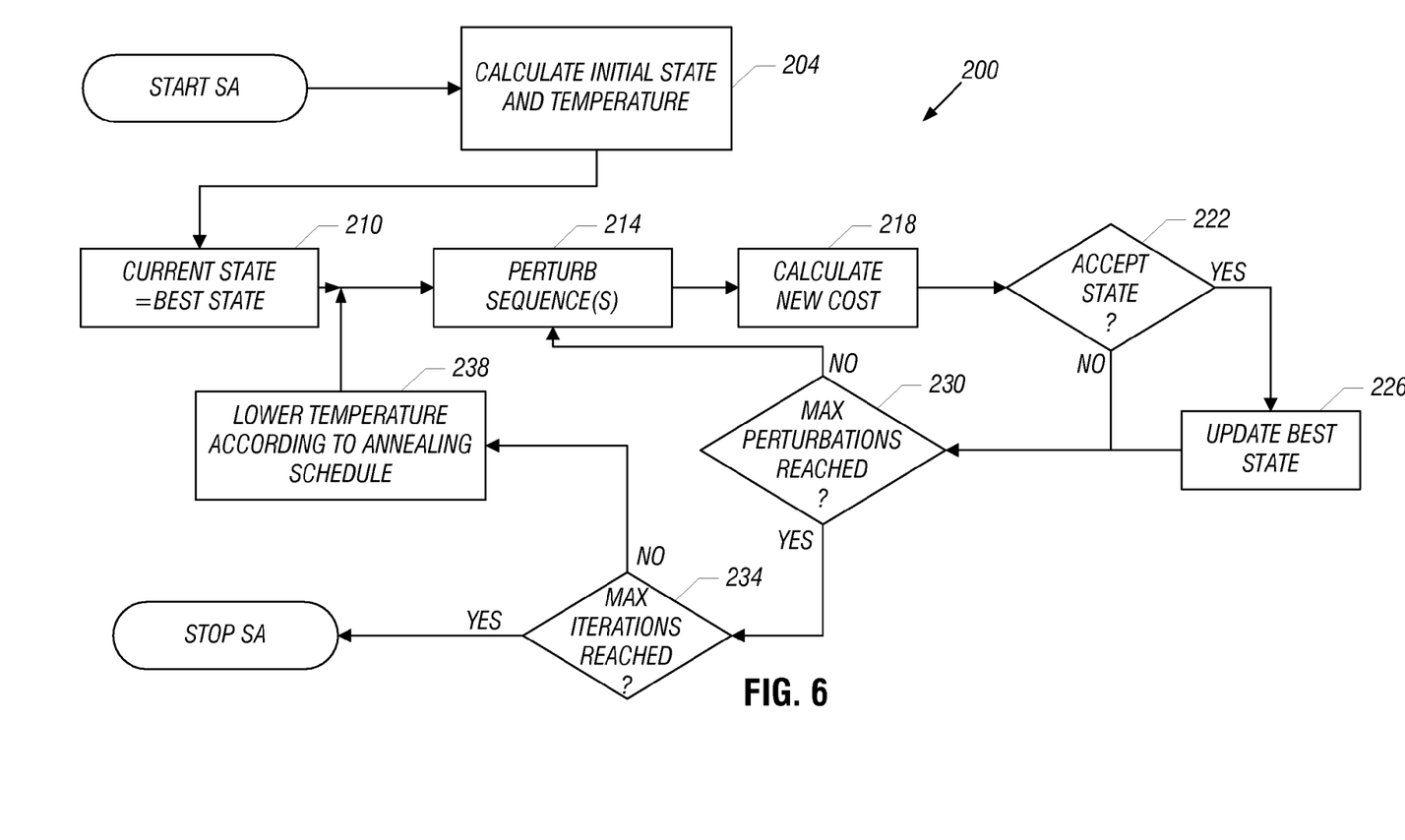

As a more specific example, for purposes of generating one or more sweep sequences, FIG. 6 depicts a simulated annealing technique 200 that may be performed by the processor of the data processing system 100 (see FIG. 4) executing instructions, in accordance with some embodiments of the invention. The technique 200 may be used for purposes of generating orthogonal sweep sequences for use with multiple seismic vibrators as well as generating a single sweep sequence that has superior autocorrelation properties. Pursuant to the technique 200, an initial state of the sweep sequence(s) and the initial temperature is first calculated, pursuant to block 204. Also, initially, the current state of the sequence(s) (i.e., the parameters that define or characterize the sweep sequence(s)) is set equal to the best state, pursuant to block 210. In the technique 200, the current state is manipulated for purposes of finding optimal sweep sequence(s). This involves a processing loop that begins with block 214.

Pursuant to block 214, the sweep sequence(s) are perturbed. It is noted that this perturbation may be random or pseudo-random, within the predefined constraints for the sweep sequences. After the perturbation, a new cost is calculated, pursuant to block 218. In accordance with some embodiments of the invention, the cost may be weighted as follows for the determination of orthogonal sweep sequences: approximately sixty-five percent of the cost is attributable to the autocorrelation estimate, thirty-four percent of the cost attributable to the cross-correlation estimate and one percent of the cost attributable to the total energy of the sweep sequences. It is noted, however, that the components of the cost may be different may be weighted differently and the components, in accordance with other embodiments of the invention. For example, in accordance with embodiments of the invention in which the technique 200 is used to generate a single sweep sequence, the corresponding cost function may be based on a ratio of the autocorrelation peak at lag zero to autocorrelation values at other lags. This is equivalent to pushing down the autocorrelation values at nonzero lags, or suppressing the sidelobes of the autocorrelation.

Based on the cost, a determination is made (diamond 222) whether to accept the new state (due to the perturbation) as the best state. As a more specific example, if the cost is decreased due to the perturbation, then in accordance with some embodiments of the invention, the new state is accepted as the best state, pursuant to block 226. If the cost is increased due to the perturbation, then the probability $P(\Delta E,T)$ (see Eq. 1) may be evaluated to determine whether to accept the new state, in accordance with some embodiments of the invention. In this regard, the probability $P(\Delta E,T)$ may be compared to a random number or a predefined threshold (depending on the particular embodiment of the invention) to determine whether to accept the current state. If the probability is greater than the random number or a predefined threshold (as examples), then the current state is accepted, pursuant to block 226. Otherwise, the current state is rejected.

After the current state is accepted or rejected, a determination is then made, pursuant to diamond 230, whether the maximum number of perturbations has been reached. In this regard, the maximum number of perturbations may be predefined so that the technique 200 is performed at a given synthetic temperature T until the maximum number of perturbations is reached. It is noted that the decision in diamond 230 may also or alternatively be based on whether a particular cost has been achieved and/or other factors, depending on the particular embodiment of the invention.

Thus, if the maximum perturbations have not been reached, control returns to block 214. If, however, the maximum number of perturbations has been reached, then a determination is made (diamond 234) whether the maximum number of iterations has been reached. In other words, the synthetic temperature T decreases pursuant to its annealing schedule (such as the one described by Eq. 2) until a certain amount of iterations have been reached. If the maximum number of iterations has not been reached, then the temperature is lowered according to the annealing schedule, pursuant to block 238, and controls returns to block 214. Otherwise, the sweep sequence(s) have been determined and the technique 200 terminates.

Figure 7:
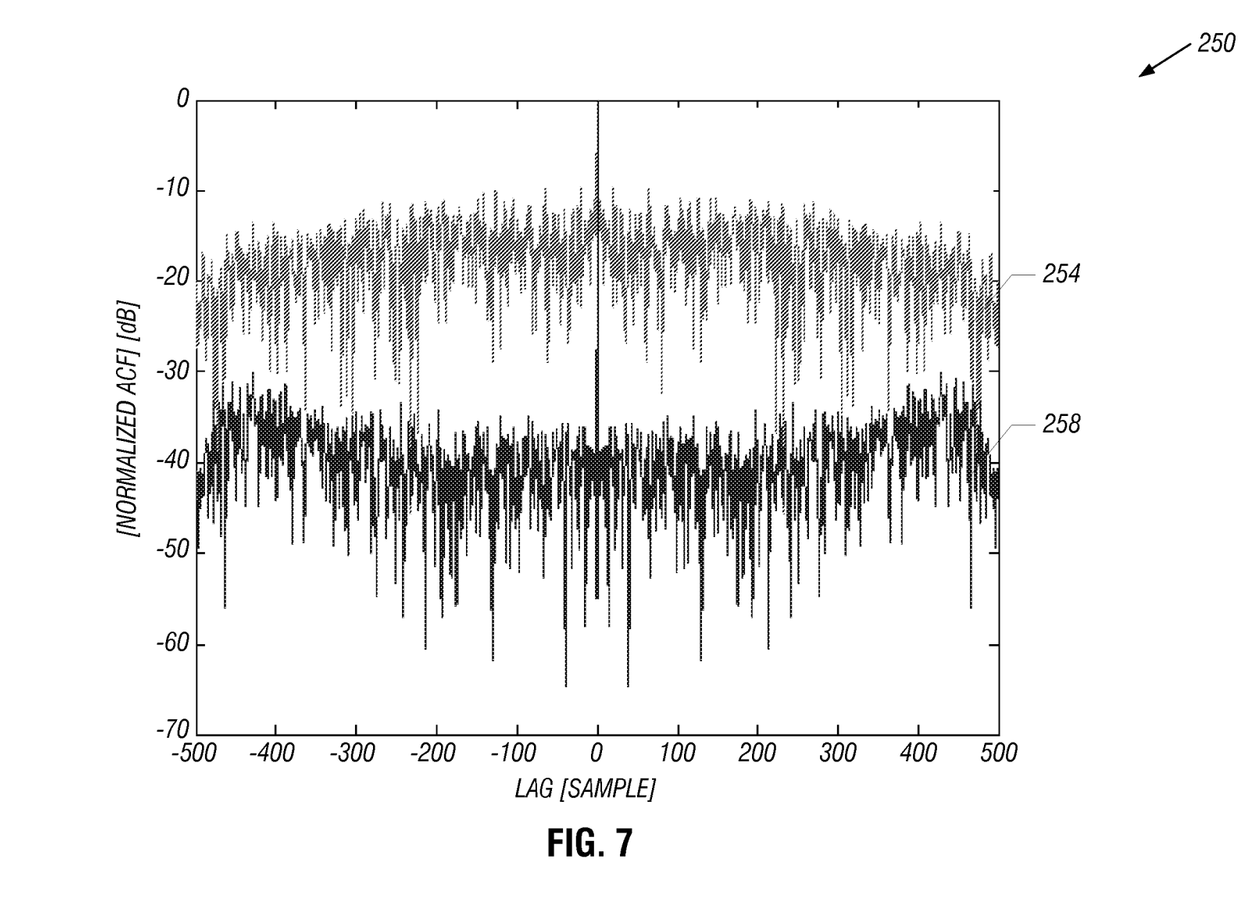
FIG. 7 depicts an autocorrelation estimate of a sweep sequence according to an embodiment of the invention.

As an example of an application of the simulated annealing technique simulation constraints were placed on the autocorrelation estimate of a sweep sequence in order to reduce the energy of the sidelobes under a particular value, and a constraint was placed on the frequency spectrum so that the spectrum was flat (i.e., constant or near constant magnitude) in a specified frequency band (a 0.5 dB variation was allowed). FIG. 7 illustrates the result of the simulation for a sequence length was 500 samples. In particular, FIG. 7 depicts a graph 258 of the sidelobe energy of the autocorrelation estimate of the generated sweep sequence. As shown, this autocorrelation estimate is below the sidelobe energy of a randomly generated sweep sequence depicted by a graph 254.

In another simulation also the cross-correlation estimate between two sweeps was reduced in addition to the sidelobes of their autocorrelation estimates. But this time there was no constraint on the frequency spectrum. The output of the simulation showed separation of amplitudes at each frequency. Because the Fourier transform of the cross-correlation is the product of the Fourier transform of one sweep with the conjugate of the Fourier transform of the second sweep, in order to minimize the cross-correlation estimates, one sequence assumed a relatively large amplitude at a given frequency, and the other sequence assumed a relatively small amplitude at that frequency. At another frequency the roles could be opposite. Total energy of each sweep was kept approximately constant in order to prevent a zero energy case for an entire sweep.

Figure 8:
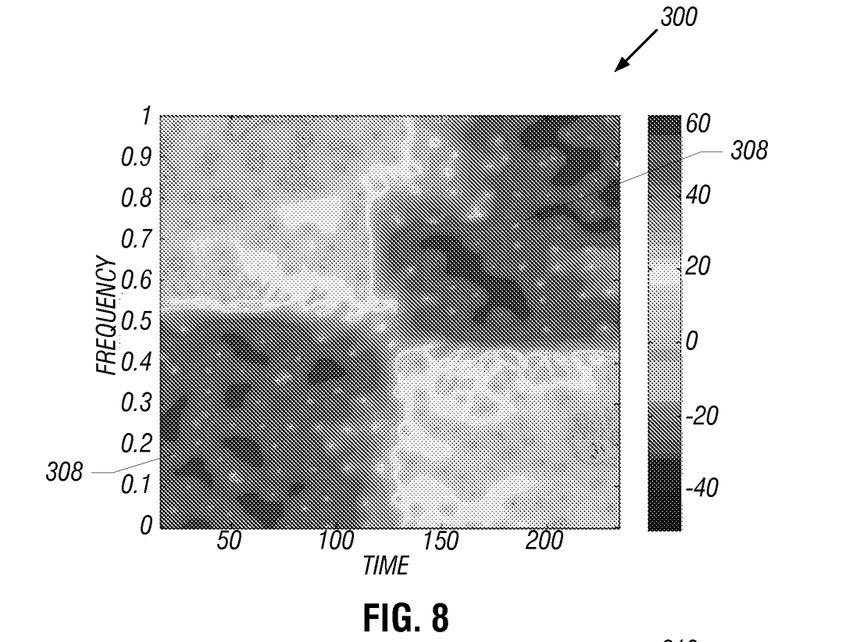
FIGS. 8 and 9 depict spectrograms of two sweep sequences according to an embodiment of the invention.
Figure 9:
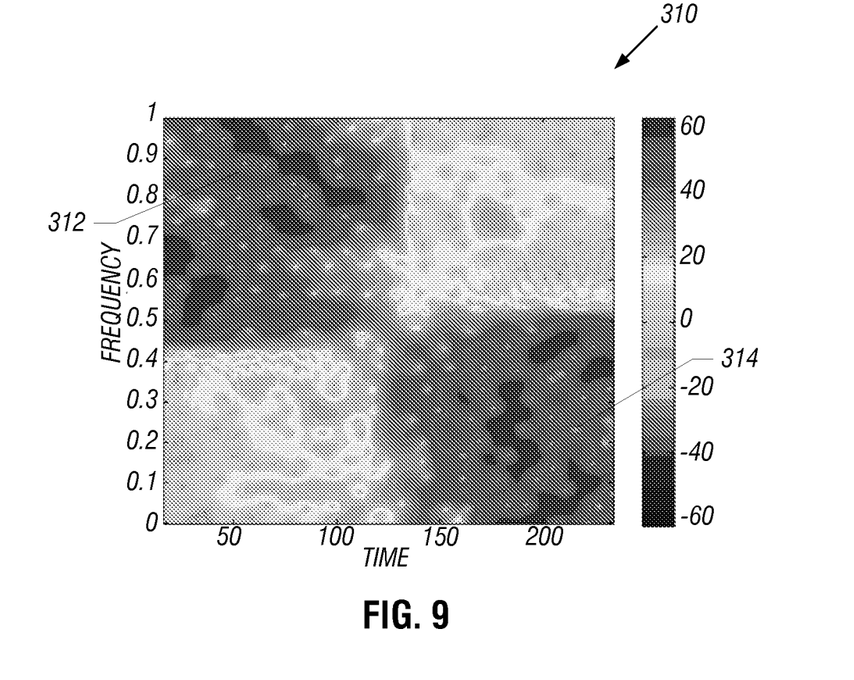

In another simulation, the amplitude spectra of two generated sweeps were kept above particular levels, not allowing frequency splitting while the cross-correlation for particular lag times was reduced. In this case it is impossible to minimize the cross-correlation estimates at all the lagtimes since spectra of both sequences were kept relatively constant. In this case we reduce the variance of the cross-correlation for a particular listening time or a window of lagtimes. In such a scenario time-frequency splitting may be the result of such an optimization. FIGS. 8 and 9 illustrate the result of the simulation. Thus, in FIG. 8 (which shows a spectrogram 300 of one of the sweep sequences, relatively lower spectral energy 304 was present in the first half and of the sweep sequence) and relatively higher frequency spectral energy 308 was present in the latter half of the sweep sequence. The inverse relationship occurred for the other sweep sequence (as depicted in its spectrogram 310 in FIG. 9): relatively higher spectral energy 312 is present in the first half of the sweep sequence and relatively lower spectral energy 314 is present in the latter half of the sequence.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   generating a plurality of broadband pseudorandom sweep sequences for seismic vibrators for a seismic survey;
   perturbing the sequences to provide a candidate perturbed state of the sequences;
   evaluating a cost for the perturbed state of the sequences;
   selectively reverting the sequences back to a previous state or accepting the candidate perturbed state based at least in part on the cost;
   continue perturbing, evaluating and selectively reverting or accepting until the cost is within a limit or a maximum number of perturbations is reached; and
   actuating a plurality of vibrators, each following one of the sweep sequences.

2. The method of claim 1, wherein the generating comprises generating orthogonal sweep sequences.

3. The method of claim 1, wherein continuing perturbing, evaluating and selectively reverting or accepting comprises maximizing a ratio of an autocorrelation peak at lag zero relative to autocorrelation values at other lags, minimizing a cross correlation factor and constructing the sequences based on predetermined phase, amplitude and spectra criteria.

4. The method of claim 1, wherein perturbing, evaluating and selectively reverting or accepting includes using a simulated annealing method.

5. The method of claim 1, wherein the act of evaluating the cost comprises determining a cost based on an autocorrelation, a cross correlation and a sweep sequence energy.

6. The method of claim 1, wherein the sweep sequences comprise vibroseis sweep sequences.

7. A method comprising:
   generating broadband pseudorandom sweep sequences for a-seismic vibrators for a seismic survey;
   perturbing the sequences to provide a candidate perturbed state of the sequences using a simulated annealing method;
   evaluating a cost for the perturbed state of the sequences;
   selectively reverting the sequences back to a previous state or accepting the candidate perturbed state based at least in part on the cost;
   continue perturbing, evaluating and selectively reverting or accepting until the cost is within a limit or a maximum number of perturbations is reached; and
   actuating the vibrators following the sweep sequence.

8. The method of claim 7, wherein continuing perturbing, evaluating and selectively reverting or accepting comprises maximizing a ratio of an autocorrelation peak at lag zero relative to autocorrelation values at other lags, minimizing a cross correlation factor and constructing the sequences based on predetermined phase, amplitude and spectra criteria.

* * * * *